United States Patent
Sun et al.

(10) Patent No.: US 12,278,698 B2
(45) Date of Patent: Apr. 15, 2025

(54) BLUETOOTH ADAPTIVE RATE SELECTION METHOD AND BLUETOOTH COMMUNICATION MODULE

(71) Applicant: Nanjing Silergy Micro Technology Co., Ltd., Nanjing (CN)

(72) Inventors: Zhongjie Sun, Nanjing (CN); Jiajie Fu, Nanjing (CN)

(73) Assignee: Nanjing Silergy Micro Technology Co., Ltd., Nanjing (CN)

( * ) Notice: Subject to any disclaimer, the term of this patent is extended or adjusted under 35 U.S.C. 154(b) by 431 days.

(21) Appl. No.: 17/708,200

(22) Filed: Mar. 30, 2022

(65) Prior Publication Data

US 2022/0345241 A1 Oct. 27, 2022

(30) Foreign Application Priority Data

Apr. 23, 2021 (CN) .......................... 202110463169.0

(51) Int. Cl.

| | |
|---|---|
| *H04L 1/00* | (2006.01) |
| *H04B 17/318* | (2015.01) |
| *H04L 1/08* | (2006.01) |
| *H04L 1/20* | (2006.01) |
| *H04W 4/80* | (2018.01) |

(52) U.S. Cl.
CPC ......... *H04L 1/0002* (2013.01); *H04B 17/318* (2015.01); *H04L 1/08* (2013.01); *H04L 1/203* (2013.01); *H04W 4/80* (2018.02)

(58) Field of Classification Search
CPC ......... H04L 1/0002; H04L 1/08; H04L 1/203; H04B 17/318; H04W 4/80
See application file for complete search history.

(56) References Cited

U.S. PATENT DOCUMENTS

| | | |
|---|---|---|
| 6,166,698 A | 12/2000 | Turnbull et al. |
| 7,224,267 B1 | 5/2007 | Ellis |
| 8,095,333 B2 | 1/2012 | Penot et al. |
| 8,421,612 B2 | 4/2013 | Sugiura |
| 8,922,359 B2 | 12/2014 | Lim |
| 9,065,594 B1 * | 6/2015 | Husted .................. H04L 1/0002 |
| 9,420,408 B2 | 8/2016 | Liu |
| 10,630,421 B1 * | 4/2020 | Jorgovanovic ........ H04L 1/0002 |
| 10,870,322 B2 | 12/2020 | Liu |
| 10,894,450 B2 | 1/2021 | Liu |

(Continued)

FOREIGN PATENT DOCUMENTS

| | | |
|---|---|---|
| CN | 102404097 A | 4/2012 |
| CN | 102862450 A | 1/2013 |
| CN | 108737997 A | 11/2018 |

*Primary Examiner* — Blake J Rubin

(57) ABSTRACT

A Bluetooth adaptive rate selection method can include: enabling the first Bluetooth module in the local device and the second Bluetooth module in a peer device to be in a connection state; in a first time period, obtaining RSSI of the radio frequency signal sent by the second Bluetooth module and received by the first Bluetooth module, and PER of the data packet sent by the first Bluetooth module or the maximum number of consecutive retransmissions of the data packet sent by the first Bluetooth module; and selecting the data transmission rate between the first Bluetooth module and the second Bluetooth module adaptively according to one of the PER and the maximum number of consecutive retransmissions and the RSSI.

20 Claims, 7 Drawing Sheets

(56) References Cited

U.S. PATENT DOCUMENTS

| | | | |
|---|---|---|---|
| 11,451,897 B1* | 9/2022 | Chinnapalli | H04W 36/035 |
| 2009/0102636 A1 | 4/2009 | Tranchina | |
| 2011/0205047 A1 | 8/2011 | Patel et al. | |
| 2017/0127445 A1* | 5/2017 | Lee | H04W 76/19 |
| 2017/0282655 A1 | 10/2017 | Liu et al. | |
| 2018/0084606 A1* | 3/2018 | Li | H04W 88/04 |
| 2018/0352558 A1* | 12/2018 | Paycher | H04W 72/1215 |
| 2019/0007850 A1* | 1/2019 | DenBoer | H04W 4/80 |
| 2019/0103905 A1* | 4/2019 | Guruprasad | H04B 7/0413 |
| 2019/0132091 A1* | 5/2019 | Cohn | H04W 72/0446 |
| 2019/0387382 A1* | 12/2019 | Wojcieszak | H04W 4/80 |
| 2020/0153567 A1* | 5/2020 | Agarwal | H04L 1/1692 |
| 2021/0136758 A1* | 5/2021 | Haartsen | H04W 56/0005 |
| 2021/0219075 A1* | 7/2021 | El-Hoiydi | H04R 25/558 |
| 2021/0250117 A1* | 8/2021 | Homchaudhuri | H04L 1/0003 |
| 2022/0070247 A1* | 3/2022 | Wang | G06F 3/165 |
| 2022/0148608 A1* | 5/2022 | Wang | H04W 4/80 |
| 2022/0263883 A1* | 8/2022 | Lee | G10L 19/24 |
| 2022/0353741 A1* | 11/2022 | Xie | H04L 1/0026 |
| 2023/0171833 A1* | 6/2023 | Haggai | H04W 76/18 |
| | | | 455/41.2 |

* cited by examiner

BLUETOOTH ADAPTIVE RATE SELECTION METHOD AND BLUETOOTH COMMUNICATION MODULE

RELATED APPLICATIONS

This application claims the benefit of Chinese Patent Application No. 2021104631690, filed on Apr. 23, 2021, which is incorporated herein by reference in its entirety.

FIELD OF THE INVENTION

The present invention generally relates to the field of vehicle monitoring technology, and more particularly, to Bluetooth adaptive rate selection methods and Bluetooth communication modules.

BACKGROUND

In practical applications, the moving range of a mobile device with a Bluetooth device is usually not fixed. When the distance between two Bluetooth devices that have established a connection is too far from each other, the received radio signal strength will inevitably decrease under the condition that the transmission power is unchanged. Due to the non-response continuous retransmission mechanism in the connected state of Bluetooth, the data throughput of the communication will eventually decrease, and even the link may be disconnected due to timeout. However, selecting different physical communication rates according to different radio environments can ensure that the throughput of device communication is not affected to the greatest extent.

DETAILED DESCRIPTION

Figure 1:
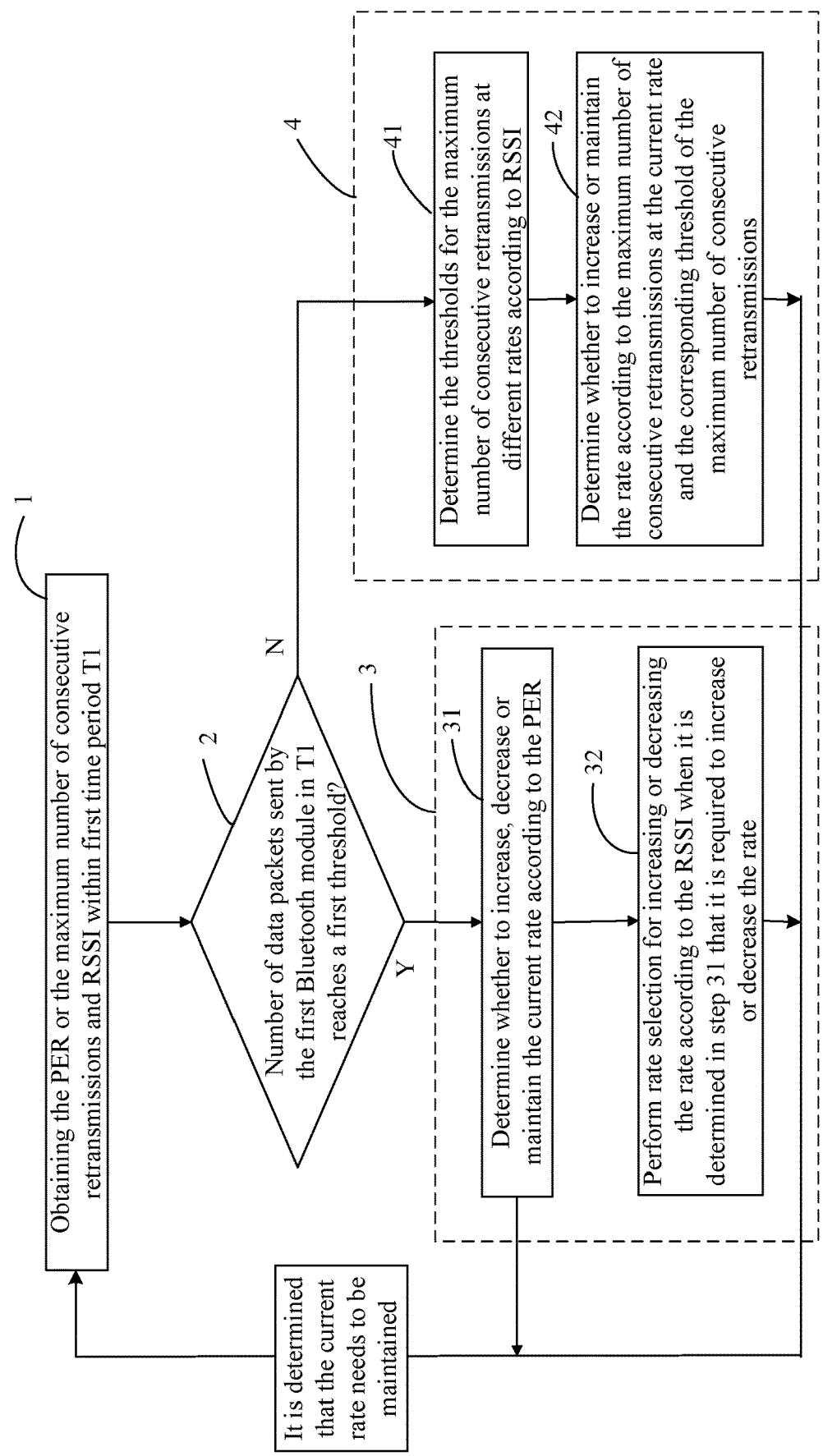
FIG. 1 is a flow chart of a first example Bluetooth adaptive rate selection method, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In some approaches, the data transmission rate between two Bluetooth devices can be selected by a single-variable algorithm, such as the obtained received signal strength indication (RSSI) or the packet error rate (PER) obtained by statistics. However, the reliability of the single-variable algorithm is relatively poor, may not smoothly select the rate, and may not be suitable for complex communication environments.

In particular embodiments, a Bluetooth adaptive rate selection method can include: enabling the first Bluetooth module in the local device and the second Bluetooth module in a peer device to be in a connection state; in a first time period, obtaining RSSI of the radio frequency signal sent by the second Bluetooth module and received by the first Bluetooth module, and PER of the data packet sent by the first Bluetooth module or the maximum number of consecutive retransmissions of the data packet sent by the first Bluetooth module; and selecting the data transmission rate between the first Bluetooth module and the second Bluetooth module adaptively according to one of the PER and the maximum number of consecutive retransmissions and the RSSI. The maximum number of consecutive retransmissions is the maximum number of data packets that are continuously unsuccessfully sent by the first Bluetooth module.

Particular embodiments can be based on the core protocol of Bluetooth 5.0 and above, and the physical layer of Bluetooth 5.0 and above may support four physical rates of 1M, 2M, 125K, and 500K (bps, that is, bit/s). Therefore, the rate selection in certain embodiments can choose among the four physical rates of 1M, 2M, 125K, and 500K. The local device can also include a control circuit, and the first Bluetooth module can receive and send signals, and count link parameter information; that is, the number of data packets sent by the first Bluetooth module, the number of the data packets successfully sent by the first Bluetooth module, the number of data packets unsuccessfully sent by the first Bluetooth module, the RSSI and the maximum number of consecutive retransmissions. The control circuit can adaptively select a data transmission rate between the first and second Bluetooth modules according to one of the PER and the maximum number of consecutive retransmissions and the RSSI. The control circuit described in the local device may be in the form of an MCU (e.g., a microcontroller), for example.

In one embodiment, the control circuit can calculate the mean value of the RSSIs and calculate the value of the PER. In another embodiment, the first Bluetooth module can include a signal processing module for calculating the mean value of the RSSIs and the value of the PER, or the control circuit can calculate the value of the PER, and the signal processing module can calculate the mean value of the RSSIs.

Referring now to FIG. 1, shown is a flow chart of a first example Bluetooth adaptive rate selection method, in accordance with embodiments of the present invention. In this particular example, the Bluetooth adaptive rate selection method can include steps 1 to 4. In step 1, the PER or the maximum number of consecutive retransmissions and RSSI can be obtained within a first time period T1. In step 2, it can be determined whether the number of data packets sent by the first Bluetooth module in first time period T1 reaches a first threshold. When the number of data packets sent by the first Bluetooth module reaches the first threshold, step 3 can be performed by a long-term rate selection method. Otherwise, step 4 can be performed by a short-term rate selection method. In step 3, the data transmission rate can be selected between the first and second Bluetooth modules adaptively with the long-term rate selection method according to the RSSI and the PER. In step 4, the rate of data transmission can be selected between the first and second Bluetooth modules adaptively with the short-term rate selection method according to the RSSI and the maximum number of consecutive retransmissions.

After performing step 3 or step 4 to complete this rate selection, step 1 can be returned to start the next rate selection. For example, when it is determined that the current rate needs to be maintained, the current rate selection is to maintain unchanged, and there may be no need to increase or decrease the rate, so step 1 can be directly returned to start the next rate selection. When it is determined that it is required to increase or decrease the rate, the rate selection for increasing or decreasing the rate needs to be performed. After the rate selection is completed, the flow can return to step 1 to start the next rate selection.

Step 3 can also include steps 31 and 32. In step 31, it can be determined whether to increase, decrease, or maintain the current rate according to the PER. When it is determined in step 31 that the rate needs to be increased or decreased, the flow can go to step 32. When it is determined in step 31 that the current rate needs to be maintained, the current rate selection is to maintain the current rate unchanged, and the flow can go to step 1 to start the next rate selection. In step 32, rate selection can be performed for increasing or decreasing the rate according to the RSSI when it is determined in step 31 that it is required to increase or decrease the rate. After completing the rate selection of increasing or decreasing the rate, the flow can go to step 1 to start the next rate selection.

Step 4 can also include steps 41 and 42. In step 41, the thresholds for the maximum number of consecutive retransmissions can be determined at different rates according to RSSI. In step 42, it can be determined whether to increase or maintain the rate according to the maximum number of consecutive retransmissions at the current rate and the corresponding threshold of the maximum number of consecutive retransmissions. When it is determined that the current rate needs to be maintained, the current rate selection is to maintain the current rate unchanged, and then the flow can go to step 1 to start the next rate selection. When it is determined to decrease the rate, the decreased rate can be selected according to certain rules. After completing the rate selection of decreasing the rate at this time, the flow can go to step 1 to start the next rate selection.

The PER in the example of FIG. 1 can be obtained in step 1. In other examples, the PER can be obtained in step 3, in order to avoid the problem that there is no need to use the PER for subsequent rate selection, but the PER is calculated excessively. The method of obtaining the PER can include counting the number of data packets sent by the first Bluetooth module, the number of data packets successfully sent by the first Bluetooth module, and the number of data packets unsuccessfully sent by the first Bluetooth module within the first time period. Also, the PER can be equal to the ratio of the number of data packets unsuccessfully sent by the first Bluetooth module to the number of data packets sent by the first Bluetooth module.

In the example of FIG. 1, the RSSI is the mean value of the RSSIs in first time period T1. In other examples, the value of the RSSI may be the RSSI at any time in first time period T1, e.g., the maximum value. The method of obtaining the mean value of the RSSI can include obtaining multiple RSSIs corresponding to multiple radio frequency signals received by the first Bluetooth module and sent by the second Bluetooth module within the first time period, and calculating the mean value of the multiple RSSIs to obtain the RSSI mean.

Figure 2:
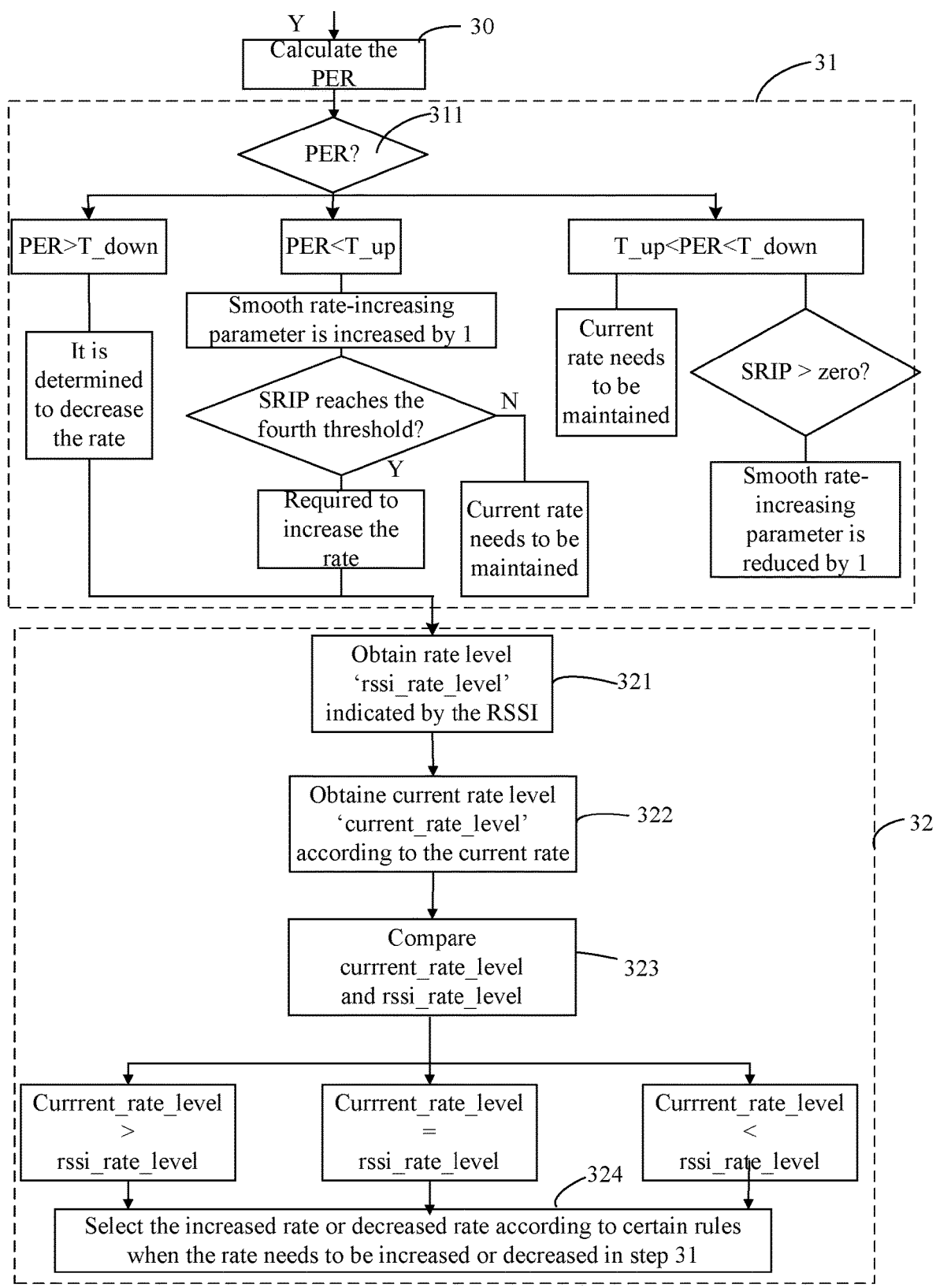
FIG. 2 is a flow chart of an example long-term rate selection method, in accordance with embodiments of the present invention.

Referring now to FIG. 2, shown is a flow chart of an example long-term rate selection method, in accordance with embodiments of the present invention. In this particular example, the long-term rate selection method includes steps 31 to 32. When the number of data packets sent by the first Bluetooth module reaches the first threshold within the first time period, steps 31 to 32 can be performed. At step 31, it can be determined whether to increase, decrease, or maintain the current rate according to the PER. For example, step 30 can be added before step 31 to calculate the PER in a case whereby there is no need to calculate the PER in step 1.

Step 31 can include step 311 that compares the PER, second threshold T_up, and third threshold T_down. For example, when the PER is less than second threshold T_up (e.g., the rate-increasing threshold), the smooth rate-increasing parameter (SRIP) can be increased by 1. When the smooth rate-increasing parameter reaches the fourth threshold, it can be determined that it is required to increase the rate. When the smooth rate-increasing parameter does not reach the fourth threshold, it is determined that the current rate needs to be maintained. When the PER is greater than third threshold T_down (e.g., the rate-decreasing threshold), it can be determined that it is required to decrease the rate. When the PER is greater than second threshold T_up and less than third threshold T_down, it can be determined that the current rate needs to be maintained. When the smooth rate-increasing parameter is greater than zero, the smooth rate-increasing parameter can be reduced by 1. When the smooth rate-increasing parameter is not greater than zero, the smooth rate-increasing parameter may remain unchanged. When it is determined in step 31 that the current rate needs to be maintained, the current rate selection can be to maintain the current rate unchanged, then go to step 1 to start the next rate selection. When it is determined in step 31 that the rate needs to be increased or decreased, step 32 may be performed.

In particular embodiments, the smooth rate-increasing parameter can be added in step 31 to avoid the situation that a single data packet is retransmitted many times continuously due to signal fluctuation at a certain moment, but may not be necessary to adjust the rate immediately. Due to the increase of the smooth rate-increasing parameter, the long-term rate selection algorithm is stable, especially when required to increase the rate. For example, the rate can be increased only when the need to increase the rate is determined for several times (e.g., when the smooth rate-increasing parameter reaches the fourth threshold, it can be determined that the rate needs to be increased, otherwise the current rate is maintained), in order to ensure smooth rate selection and transformation. In other examples, especially when the requirement for smoothness is not high, the smooth rate-increasing parameter may not be added in step 31. For example, when the PER is less than second threshold T_up, it can be determined that the rate needs to be increased.

When the PER is greater than third threshold T_down, it can be determined that the rate needs to be decreased. When the PER is greater than second threshold T_up and less than third threshold T_down, it can be determined that the current rate needs to be maintained.

At step 32, when it is determined in step 31 that the rate needs to be increased or decreased, the increased or decreased rate can be selected according to the RSSI. Further, step 32 can include steps 321 to 324. In step 321, the rate level can be classified according to the RSSI, and rate level 'rssi_rate_level' as indicated by the RSSI, which may characterize the rate level recommended by the RSSI. In step 322, the current rate may be classified to obtain current rate level 'current_rate_level'. For example, when the current rate is 1M or 2M, rate level 'current_rate_level' is the high rate level, and when the current rate is 125K or 500K, rate level 'current_rate_level' is the low rate level. In step 323, rate level 'rssi_rate_level' indicated by the RSSI and current rate level 'current_rate_level' can be compared. In step 324 the increased rate or decreased rate can be selected according to certain rules, in accordance with the comparison result in step 323 and the rate regulation direction determined in step 31 that needs to be increased or decreased. After completing the rate selection of this time, the flow can return to step 1 to start the next rate selection.

In other examples, steps 321 and 322 can be set in step 31, such as steps 321 and 322 can be set between step 311 and step 30, or between step 30 and step 2, which may not affect the rate selection. In particular embodiments, when step 31 determines that the current rate is maintained, there may be no need to classify the rate level and classify the current rate by level according to RSSI. This can avoid the problem of again classifying the rate level and classifying the current rate according to the RSSI after it is determined in step 31 that the current rate needs to be maintained.

Figure 3:
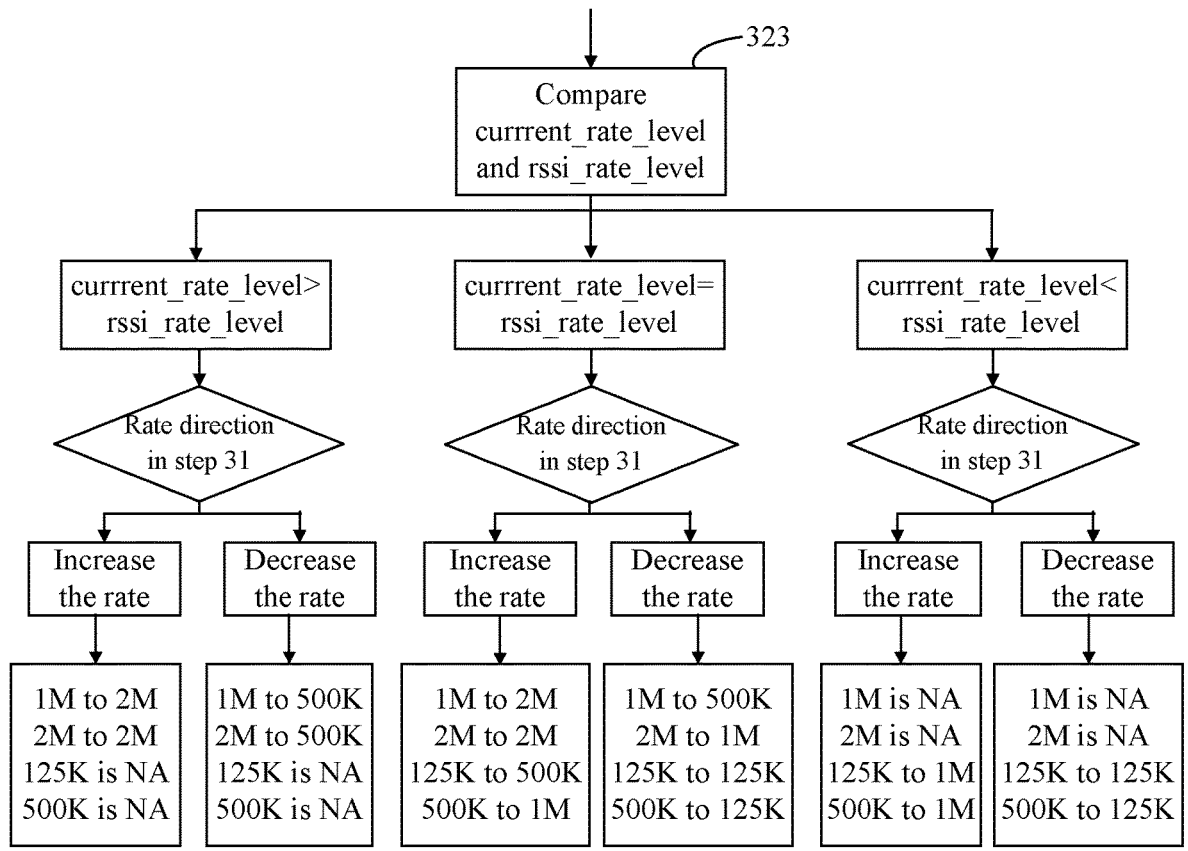
FIG. 3 is a flow chart of the example long-term rate selection method for increasing or decreasing rate, in accordance with embodiments of the present invention.

Referring now to FIG. 3, shown is a flow chart of the example long-term rate selection method for increasing or decreasing rate, in accordance with embodiments of the present invention. According to the comparison result in step 323, and according to the rate regulation direction determined in step 31, the selection to increase or decrease the rate can be performed based on certain rules. First, in step 323, rate level 'rssi_rate_level' indicated by the RSSI and current rate level 'current_rate_level' can be compared.

When rate level 'rssi_rate_level' indicated by the RSSI is less than current rate level 'current_rate_level', this can indicate that the current rate level is a high rate level; that is, the current rate is 1M or 2M. When it is determined in step 31 that it is necessary to increase the rate, the rate can be selected as 2M. When it is determined in step 31 that it is necessary to decrease the rate, the rate can be selected as 500K. When rate level 'rssi_rate_level' indicated by the RSSI is greater than current rate level 'current_rate_level', this can indicate that the current rate level is a low rate level at this time; that is, the current rate is 125K or 500K. When it is determined in step 31 that it is necessary to increase the rate, the rate can be selected as 1M. when it is determined in step 31 that it is necessary to decrease the rate, the rate can be selected as 125K.

When rate level 'rssi_rate_level' indicated by the RSSI is equal to current rate level 'current_rate_level', this can indicate that the current rate level is a low rate level or a high rate level; that is, the current rate is one of 125K, 500K, 1M and 2M. When it is determined in step 31 that it is necessary to increase the rate, and when the current rate is 1M or 2M, the rate can be selected as 2M. When the current rate is 500K, the rate is selected as 1M. When the current rate is 125K, the rate can be selected as 500K. When it is determined in step 31 that it is necessary to decrease the rate, and when the current rate is 125K or 500K, the rate can be selected as 125K. When the current rate is 1M, the rate can be selected as 500K. When the current rate is 2M, the rate can be selected as 1M.

For the three comparison results in step 323 or at least for two of the three comparison results in step 323, the rules for selecting to increase the rate or decrease the rate may not be the same. In particular embodiments, the specific rate selection rules can be exemplarily given based on the three comparison results. According to the comparison result in step 323 and the rate regulation direction that needs to be increased or decreased determined in step 31, the scheme of selecting to increase the rate or decrease the rate according to any suitable rules may also be supported in certain embodiments.

Figure 4:
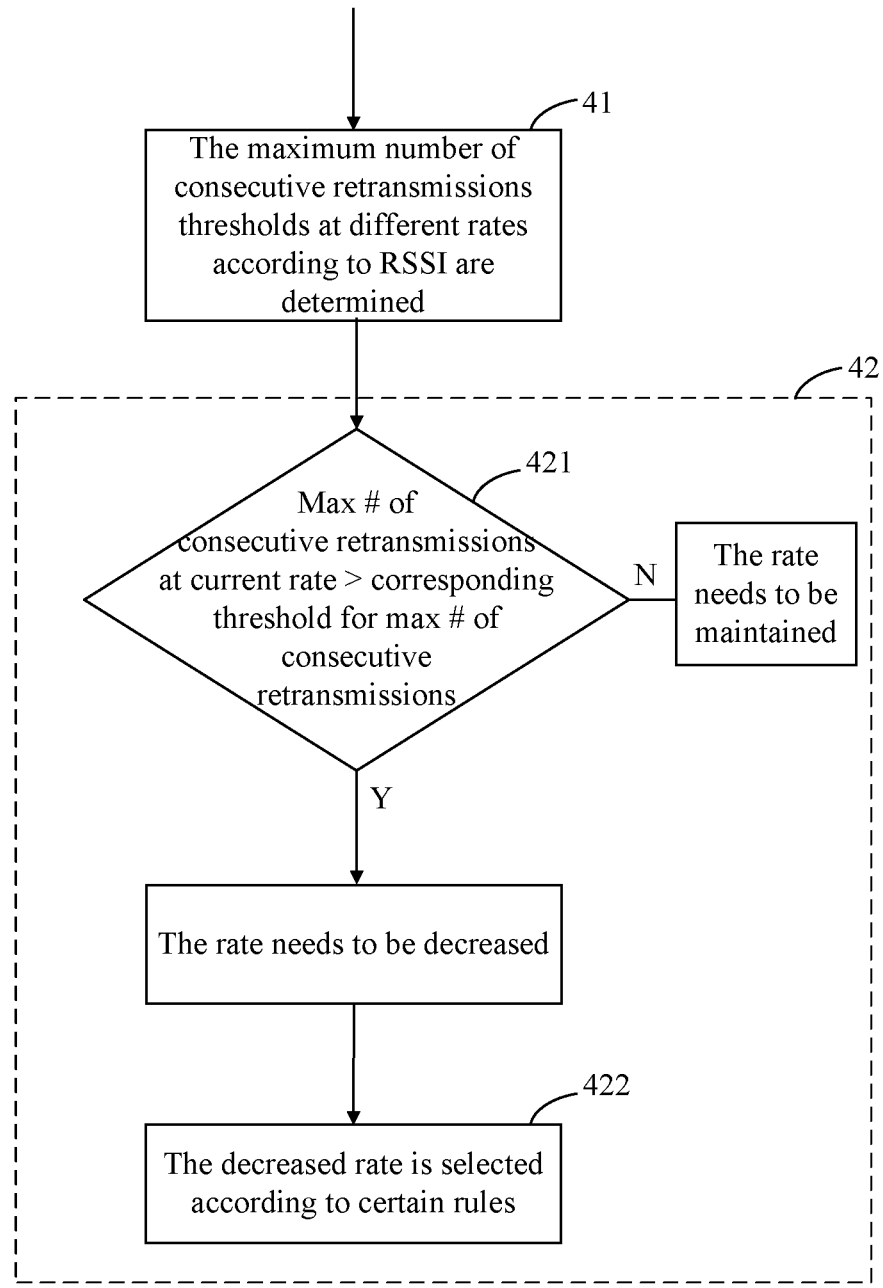
FIG. 4 is a flow chart of an example short-term rate selection method, in accordance with embodiments of the present invention.

Referring now to FIG. 4, shown is a flow chart of an example short-term rate selection method, in accordance with embodiments of the present invention. The short-term rate selection method can include steps 41 to 42. When the number of data packets sent by the first Bluetooth module does not reach the first threshold within a first time period, steps 41 to 42 may be performed. At step 41, the maximum number of consecutive retransmissions thresholds at different rates according to RSSI can be determined.

Figure 5:
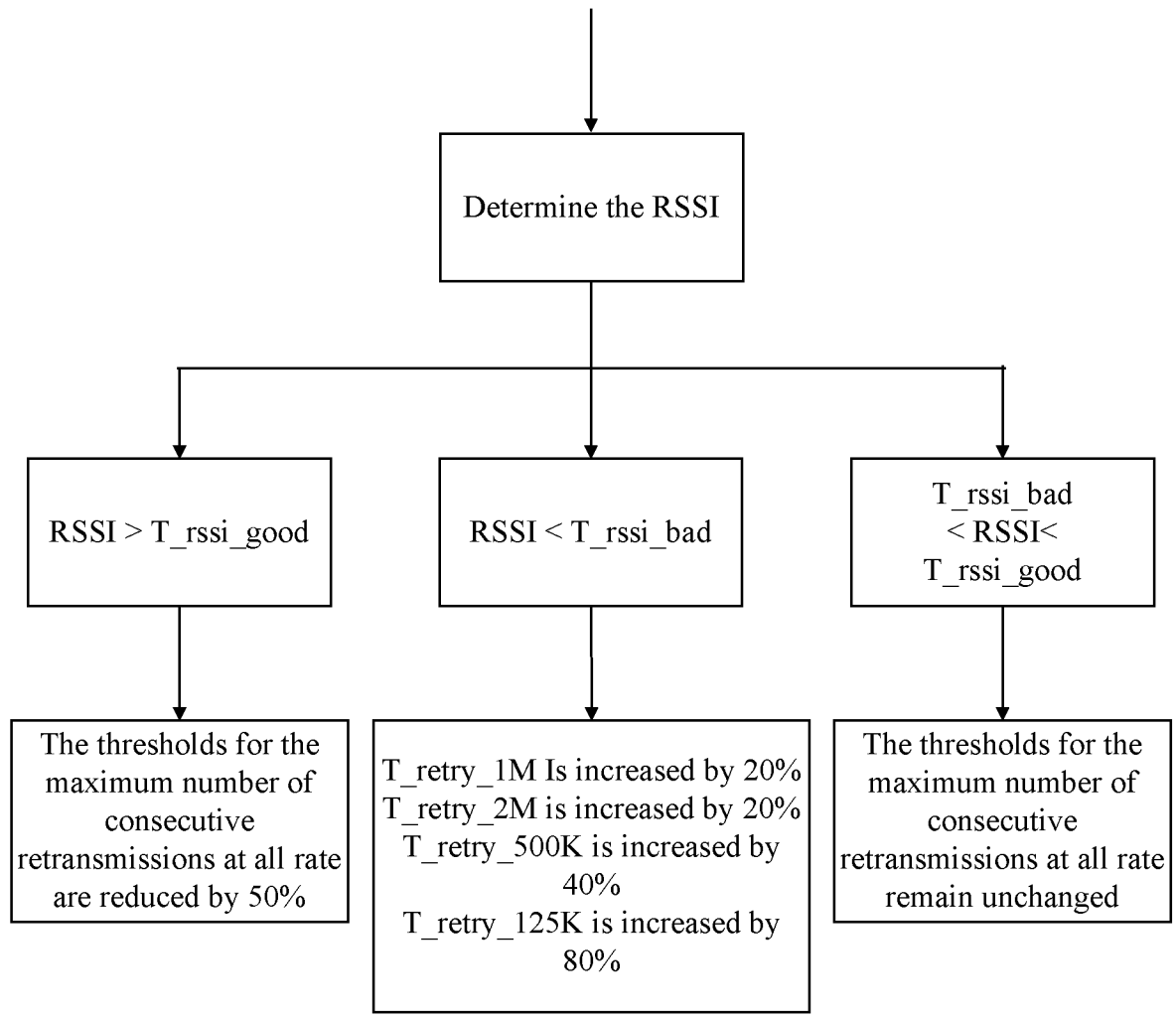
FIG. 5 is a flow chart of generating a threshold for the maximum number of consecutive retransmissions, in accordance with embodiments of the present invention.

Referring now to FIG. 5, shown is a flow chart of generating thresholds for the maximum number of consecutive retransmissions, in accordance with embodiments of the present invention. When the RSSI is greater than fifth threshold 'T_rssi_good', the thresholds for the maximum number of consecutive retransmissions at all rate may be reduced by 50%. When the RSSI is less than sixth threshold 'T_rssi_bad', the corresponding threshold T_retry_1M or T_retry_2M for the maximum number of consecutive retransmissions can be increased by 20% when the current rate is 1M or 2M. The corresponding threshold T_retry_500K for the maximum number of consecutive retransmissions may be increased by 40% when the current rate is 500K. The corresponding threshold T_retry_125K for the maximum number of consecutive retransmissions can be increased by 80% when the current rate is 125K. When the RSSI is greater than sixth threshold 'T_rssi_bad' and less than fifth threshold 'T_rssi_good', the thresholds for the maximum number of consecutive retransmissions at all rate may remain unchanged; that is, equal to the initial threshold of the corresponding threshold for the maximum number of consecutive retransmissions. In one example, the initial threshold remains unchanged in each rate selection, and the above-mentioned increase and decrease of the threshold for the maximum number of consecutive retransmissions can be performed on the basis of the corresponding initial threshold.

It should be noted that FIG. 5 provides an example of determining the thresholds of the maximum number of consecutive retransmissions at different rates according to the RSSI. In other examples, when the RSSI is less than sixth threshold is 'T_rssi_bad', the thresholds for the maximum number of consecutive retransmissions at all rate can be increased by 20%, so any suitable method of determining the thresholds for the maximum number of consecutive retransmissions at different rates according to RSSI can be supported in certain embodiments.

At step 42 in FIG. 4, it can be determined whether to decrease or maintain the current rate according to the maximum number of consecutive retransmissions at the current rate and the corresponding threshold of the maximum number of consecutive retransmissions. When it is determined to decrease the rate, the decreased rate can be selected according to certain rules. Step 42 can include steps 421 and 422. At step 421, it can be determined whether to decrease or maintain the current rate according to the maximum number of consecutive retransmissions at the current rate and the corresponding threshold for the maximum number of consecutive retransmissions. When the maximum number of consecutive retransmissions at the current rate is greater than the corresponding threshold for the maximum number of consecutive retransmissions, it can be determined that the rate needs to be decreased; otherwise, the current rate can be maintained.

Figure 6:
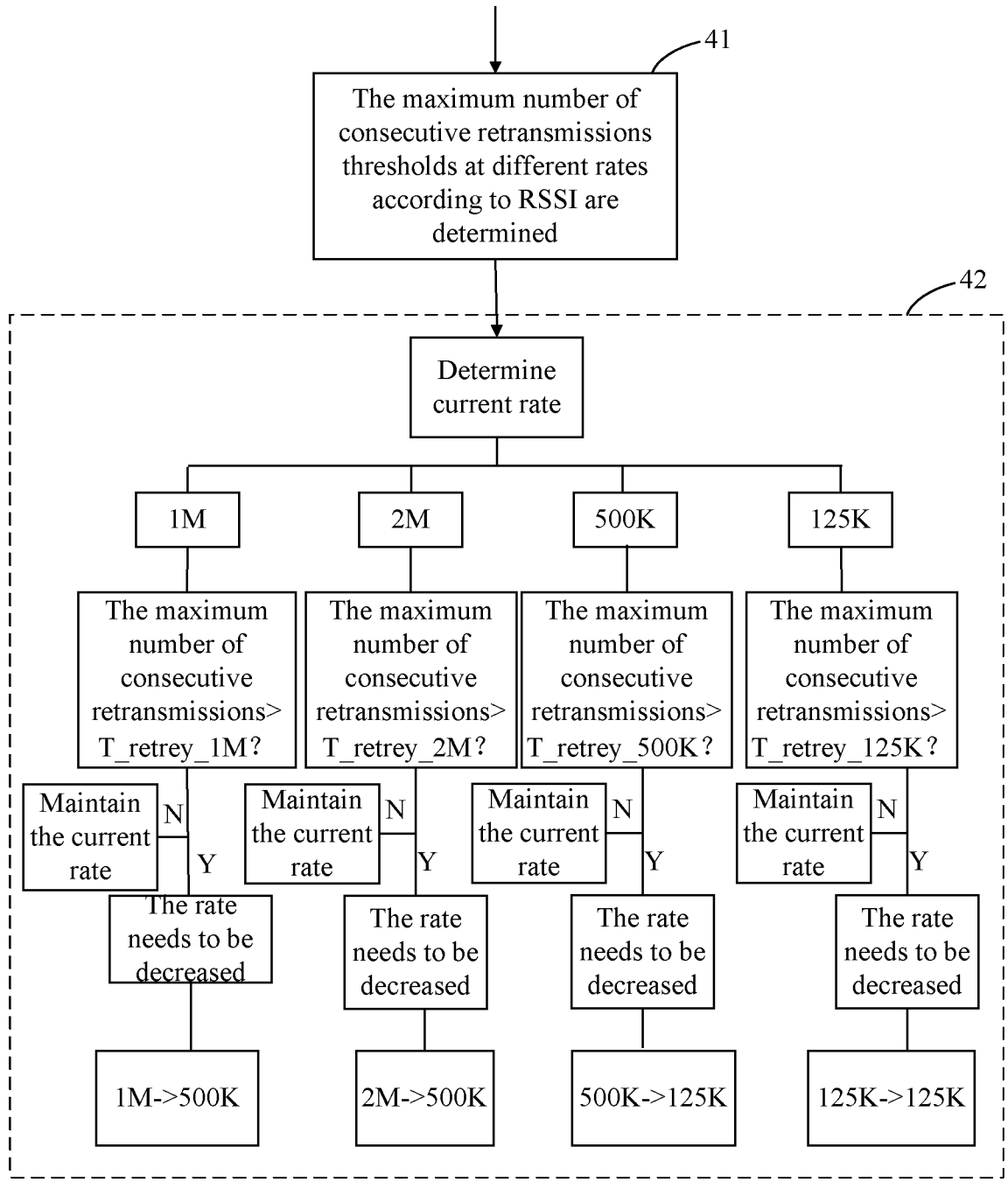
FIG. 6 is a flow chart of performing rate selection with the short-term rate selection method, in accordance with embodiments of the present invention.

Referring now to FIG. 6, shown is a flow chart of performing rate selection with the short-term rate selection method, in accordance with embodiments of the present invention. First, it can be determined whether the current rate is determined to be 1M, 2M, 500K or 125K, and then determine whether it is necessary to decrease or maintain the current rate according to the threshold (T_retry_1M, T_retry_2M, T_retry_500K, or T_retry_125K) for the maximum number of consecutive retransmissions corresponding to the current rate obtained in step 5 and the maximum number of consecutive retransmissions. For example, when it is determined that the current rate is 1M, the maximum number of consecutive retransmissions and threshold T_retry_1M for the maximum number of consecutive retransmissions corresponding to the current rate can be used to determine whether to decrease or maintain the current rate. When the maximum number of consecutive retransmissions is greater than threshold T_retry_1M, it can be determined that the rate needs to be decreased, and otherwise the current rate may be maintained. It can be understood that the subsequent processing of determining that the current rate is 2M, 500K or 125K is similar to the subsequent processing of determining that the current rate is 1M.

When it is determined in step 421 of FIG. 4 that the current rate needs to be maintained, that is, the current rate selection is to maintain the current rate unchanged, then the flow can go to step 1 to start the next rate selection. When it is determined in step 421 that the rate needs to be decreased, step 422 may be performed. In step 422, when it is determined that the rate needs to be decreased, the decreased rate can be selected according to certain rules. After completing the decreased rate selection this time, the flow can go to step 1 to start the next rate selection. In FIG. 6, when it is determined in step 421 that the rate needs to be decreased, and when the current rate is 1M or 2M, the rate can be selected as 500K. when the current rate is 500K or 125K, the rate can be selected as 125K. A specific rate selection rule for decreasing the rate is given in the example FIG. 6; however, any suitable approach for selecting the decreased rate can be supported in certain embodiments.

Figure 7:
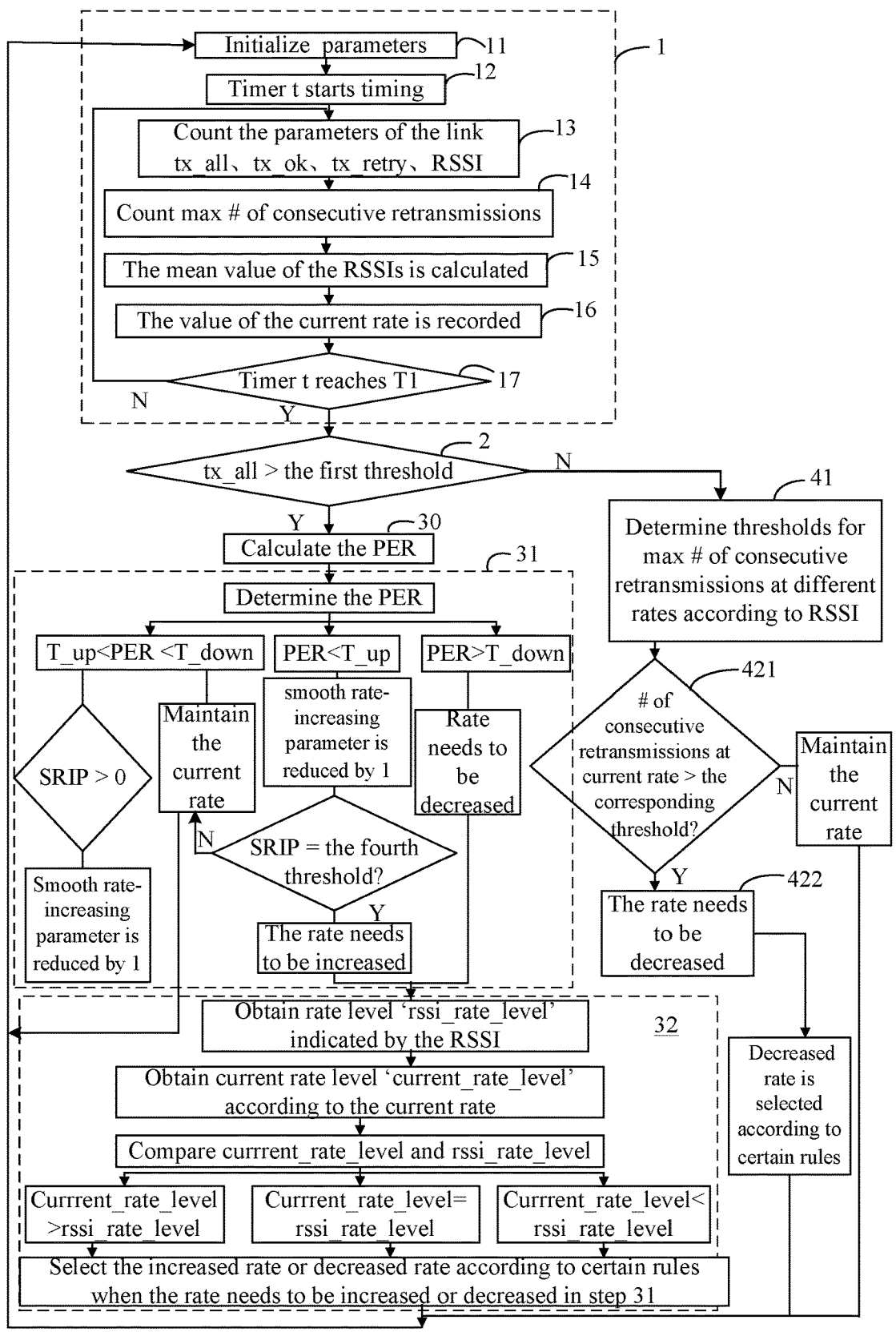
FIG. 7 is a flow chart of a second example Bluetooth adaptive rate selection method, in accordance with embodiments of the present invention.

Referring now to FIG. 7, shown is a flow chart of a second example Bluetooth adaptive rate selection method, in accordance with embodiments of the present invention. The difference from the first example is that a specific step of obtaining the PER or the maximum number of consecutive retransmissions and RSSI within first time period T1 in step 1 is given, and the rest are the same as those in the first example. The step 1 here can include steps 11 to 17. In step 11, the parameters can be initialized. In step 12, timer t can be controlled to start timing.

In step 13, the parameters of the link can be counted by the link layer, including the number of data packets tx_all sent by the first Bluetooth module, and the number of data packets successfully tx_ok sent by the first Bluetooth module (that is, the number of data packets sent by the first Bluetooth module and receiving ACK from the second Bluetooth module ACK), the number of data packets tx_retry not successfully sent by the first Bluetooth module (that is, the number of data packets sent by the first Bluetooth module but not receiving ACK from the second Bluetooth module (that is, the number of data packets repeatedly sent by the first Bluetooth module), and the RSSI of the radio frequency signal sent by the second Bluetooth module and received by the first Bluetooth module. In step 13, the parameters tx_all, tx_ok, tx_retry and RSSI can be triggered to be counted by link interruption. In other examples, parameter tx_all may not be counted in step 13, and subsequently parameter tx_all can be directly calculated, where tx_all=tx_ok+tx_retry.

In step 14, the maximum number of consecutive retransmissions (e.g., the number of data packets repeatedly sent by the first Bluetooth module) tx_max_contrety can be counted. In step 15, the mean value of the RSSIs can be calculated. When the RSSI used in the subsequent steps is the RSSI at any time in first time period T1, such as the maximum value, step 15 may not need to be performed. In step 16, the value of the current rate can be recorded. In step 17, whether timer t reaches first time period T1 can be determined. When it reaches first time period T1, then step 2 may be performed, that is, to determine whether the number of data packets tx_all sent by the first Bluetooth module is greater than the first threshold. When it does not reach first time period T1, the flow can go to step 13. In particular embodiments, the calculation of the PER may be obtained in step 3, and in other examples, the PER can be obtained in step 1. For example, step 30 is to calculate the PER. In particular embodiments, step 30 is set between steps 2 and 31, and in other examples, step 30 is set between steps 17 and 2. Here, the PER=tx_retry/(tx_retry+tx_ok)=tx_retry/tx_all.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A Bluetooth adaptive rate selection method, the method comprising:
   a) enabling a first Bluetooth module in a local device and a second Bluetooth module in a peer device to be in a connection state;
   b) obtaining a received signal strength indication (RSSI) of a radio frequency signal sent by the second Bluetooth module and received by the first Bluetooth module within a first time period, a packet error rate (PER) of a data packet sent by the first Bluetooth module, and a maximum number of consecutive retransmissions of the data packet sent by the first Bluetooth module;
   c) selecting a rate of data transmission between the first Bluetooth module and the second Bluetooth module adaptively according to the RSSI and the PER when the number of data packets sent by the first Bluetooth module reaches a first threshold within the first time period;
   d) selecting the rate of data transmission between the first Bluetooth module and the second Bluetooth module adaptively according to the RSSI and the maximum number of consecutive retransmissions when the number of data packets sent by the first Bluetooth module does not reach a first threshold within the first time period; and e) selecting the rate of data transmission between the first Bluetooth module and the second Bluetooth module adaptively using a long-term rate selection method comprising determining whether to increase, decrease, or maintain the current rate according to the PER, and performing selection of increased rate or decreased rate according to the RSSI when it is determined that the rate needs to be increased or decreased.

2. The method of claim 1, further comprising:
a) obtaining a plurality of RSSIs corresponding to a plurality of radio frequency signals sent by the second Bluetooth module and received by the first Bluetooth module within the first time period;
b) calculating a mean value of the plurality of RSSIs to obtain a RSSI mean; and
c) selecting the rate of data transmission between the first Bluetooth module and the second Bluetooth module adaptively according to the RSSI mean and one of the PER and the maximum number of consecutive retransmissions.

3. The method of claim 1, further comprising:
a) counting the number of data packets sent by the first Bluetooth module, the number of data packets successfully sent by the first Bluetooth module and the number of data packets unsuccessfully sent by the first Bluetooth module within the first time period; and
b) wherein the PER is configured to be equal to a ratio of the number of data packets unsuccessfully sent by the first Bluetooth module to the number of data packets sent by the first Bluetooth module.

4. The method of claim 1, wherein determining whether to increase, decrease or maintain the current rate according to the PER comprises:
a. determining to increase the rate when the PER is less than a second threshold;
b. determining to decrease the rate when the PER is greater than a third threshold; and
c. determining to maintain the current rate when the PER is greater than the second threshold and less than the third threshold.

5. The method of claim 1, wherein:
d. when the PER is less than a second threshold, a smooth rate-increasing parameter is increased by 1;
e. when the smooth rate-increasing parameter reaches a fourth threshold, it is determined that the rate needs to be increased;
f. when the smooth rate-increasing parameter does not reach the fourth threshold, it is determined that the rate needs to be maintained at the current rate;
g. when the PER is greater than a third threshold, it is determined that the rate needs to be decreased; and
h. when the PER is greater than the second threshold and less than the third threshold, it is determined that the current rate needs to be maintained, and when the smooth rate-increasing parameter is greater than zero, the smooth rate-increasing parameter is decreased by 1.

6. The method of claim 1, wherein performing selection of increased rate or decreased rate according to the RSSI comprises:
i. classifying rate levels according to the RSSI to obtain the rate levels indicated by the RSSI;
j. classifying the current rate to get a current rate level;
k. comparing the rate levels indicated by the RSSI and the current rate level; and l. performing rate selection for increasing or decreasing the rate based on certain rules, in accordance with a comparison result and a regulation direction to increase or decrease the rate determined according to the PER.

7. The method of claim 6, wherein:
a) when the rate level indicated by the RSSI is less than the current rate level, and determined that the rate needs to be increased, the rate is selected as 2M;
b) when the rate level indicated by the RSSI is less than the current rate level, and determined that the rate needs to be decreased, the rate is selected as 500K;
c) when the rate level indicated by the RSSI is greater than the current rate level, and when it is determined that the rate needs to be increased, the rate is selected as 1M;
d) when the rate level indicated by the RSSI is greater than the current rate level, and when it is determined that the rate needs to be decreased, the rate is selected as 125K;
e) when the rate level indicated by the RSSI is equal to the current rate level, and when it is determined that the rate needs to be increased, the rate is selected 2M, 1M, or 500K; and
f) when the rate level indicated by the RSSI is equal to the current rate level, and when it is determined that the rate needs to be decreased, the rate is selected as 125K, 500K, or 1M.

8. The method of claim 7, wherein when the rate level indicated by the RSSI is equal to the current rate level:
a) when it is determined that the rate needs to be increased, and when the current rate is 1M or 2M, the rate is selected as 2M;
b) when it is determined that the rate needs to be increased, and when the current rate is 500K, the rate is selected as 1M;
c) when it is determined that the rate needs to be increased, and when the current speed is 125K, the rate is selected as 500K;
d) when it is determined that the rate needs to be decreased, and when the current rate is 125K or 500K, the rate is selected as 125K;
e) when it is determined that the rate needs to be decreased, and when the current rate is 1M, the rate is selected as 500K; and
f) when it is determined that the rate needs to be decreased, and when the current rate is 2M, the rate is selected as 1M.

9. A Bluetooth adaptive rate selection method, the method comprising:
a. enabling a first Bluetooth module in a local device and a second Bluetooth module in a peer device to be in a connection state;
b. obtaining a received signal strength indication (RSSI) of a radio frequency signal sent by the second Bluetooth module and received by the first Bluetooth module within a first time period, a packet error rate PER) of a data packet sent by the first Bluetooth module, and a maximum number of consecutive retransmissions of the data packet sent by the first Bluetooth module;
c. selecting a rate of data transmission between the first Bluetooth module and the second Bluetooth module adaptively according to the RSSI and the PER when the number of data packets sent by the first Bluetooth module reaches a first threshold within the first time period;
d. selecting the rate of data transmission between the first Bluetooth module and the second Bluetooth module adaptively according to the RSSI and the maximum number of consecutive retransmissions when the number of data packets sent by the first Bluetooth module does not reach a first threshold within the first time period; and e. selecting the rate of data transmission between the first Bluetooth module and the second Bluetooth module adaptively using a short-term rate selection method comprising determining corresponding thresholds for the maximum number of consecutive retransmission threshold at different rates according to the RSSI, determining whether to decrease or maintain the current rate according to the maximum number of consecutive retransmissions at the current rate and a corresponding threshold for the maximum number of consecutive retransmissions, and selecting a decreased rate according to certain rules when it is determined that the rate needs to be decreased.

10. The method of claim 9, wherein:

a) when the RSSI is greater than a fifth threshold, the thresholds for the maximum number of consecutive retransmissions at all rate are reduced by 50%;

b) when the RSSI is less than a sixth threshold, the threshold for the maximum continuous retransmissions is increased by 20% when the current rate is 1M or 2M, the threshold for the maximum number of consecutive retransmissions is increased by 40% when the current rate is 500K, and the threshold for the maximum number of consecutive retransmissions is increased by 80% when the current rate is 125K; and c) when the RSSI is greater than the sixth threshold and less than the fifth threshold, the thresholds for the maximum number of consecutive retransmissions at all rates remain unchanged.

11. The method of claim 9, wherein when the maximum number of consecutive retransmissions at the current rate is greater than the corresponding threshold for the maximum number of consecutive retransmissions at the current rate, the rate is determined to be decreased; otherwise, the rate is determined to be maintained at the current rate.

12. The method of claim 9, wherein under the condition of determining to decrease the rate:

a) when the current rate is 1M or 2M, the rate is selected as 500K; and b when the current rate is 500K or 125K, the rate is selected as 125K.

13. The method of claim 1, wherein after completing one rate selection, the next rate selection is started.

14. A Bluetooth communication module, comprising:

a) the local device, comprising the first Bluetooth module; and b) the peer device, comprising the second Bluetooth module, wherein the local device further comprises a control circuit to adaptively select a data transmission rate between the first Bluetooth module and the second Bluetooth module according to the Bluetooth adaptive rate selection method of claim 1.

15. The method of claim 9, wherein after completing one rate selection, the next rate selection is started.

16. A Bluetooth communication module, comprising:

a. the local device, comprising the first Bluetooth module; and b. the peer device, comprising the second Bluetooth module, wherein the local device further comprises a control circuit to adaptively select a data transmission rate between the first Bluetooth module and the second Bluetooth module according to the Bluetooth adaptive rate selection method of claim 9.

17. The method of claim 9, further comprising:

a. obtaining a plurality of RSSIs corresponding to a plurality of radio frequency signals sent by the second Bluetooth module and received by the first Bluetooth module within the first time period;

b. calculating a mean value of the plurality of RSSIs to obtain a RSSI mean; and c. selecting the rate of data transmission between the first Bluetooth module and the second Bluetooth module adaptively according to the RSSI mean and one of the PER and the maximum number of consecutive retransmissions.

18. The method of claim 9, further comprising:

a. counting the number of data packets sent by the first Bluetooth module, the number of data packets successfully sent by the first Bluetooth module and the number of data packets unsuccessfully sent by the first Bluetooth module within the first time period; and b. wherein the PER is configured to be equal to a ratio of the number of data packets unsuccessfully sent by the first Bluetooth module to the number of data packets sent by the first Bluetooth module.

19. The method of claim 9, wherein determining whether to increase, decrease or maintain the current rate according to the PER comprises:

a. determining to increase the rate when the PER is less than a second threshold;

b. determining to decrease the rate when the PER is greater than a third threshold; and c. determining to maintain the current rate when the PER is greater than the second threshold and less than the third threshold.

20. The method of claim 9, wherein:

a. when the PER is less than a second threshold, a smooth rate-increasing parameter is increased by 1;

b. when the smooth rate-increasing parameter reaches a fourth threshold, it is determined that the rate needs to be increased;

c. when the smooth rate-increasing parameter does not reach the fourth threshold, it is determined that the rate needs to be maintained at the current rate;

d. when the PER is greater than a third threshold, it is determined that the rate needs to be decreased; and e. when the PER is greater than the second threshold and less than the third threshold, it is determined that the current rate needs to be maintained, and when the smooth rate-increasing parameter is greater than zero, the smooth rate-increasing parameter is decreased by 1.

\* \* \* \* \*